Patented Dec. 7, 1926.

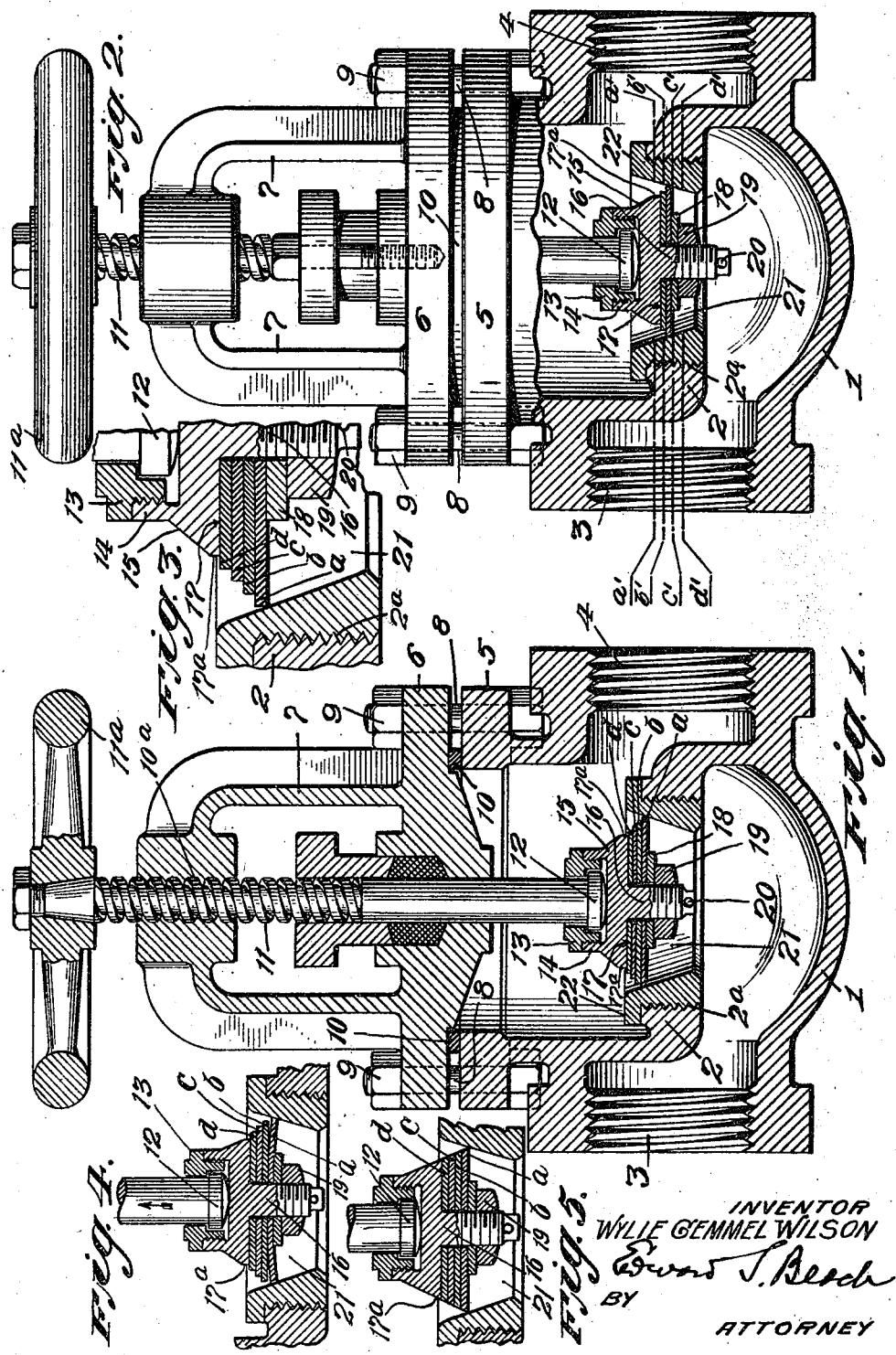

1,609,340

UNITED STATES PATENT OFFICE.

WYLIE GEMMEL WILSON, OF ELIZABETH, NEW JERSEY.

RECIPROCATING VALVE.

Application filed October 30, 1925. Serial No. 65,713.

This invention relates to reciprocating valves. Its object is to produce a non-sticking lifting valve having a fluid tight, port joint in which the complementary sealing or joint forming surfaces do not necessarily require the usual grinding operations either when first made or when subsequently repaired; and which comprises a tapered pile of separable, flatwise assembled sealing disks of preferably successively reduced diameter clamped together concentrically and being separately and successively usable as a sealing member for peripheral, disk corner contact with successive cross-sectional wall portions of an annular, tapered valve port. The disks are preferably so thin that if the peripheral corner of the disk in use as a sealing member sticks, force applied for separating the closure members of the valve causes the disk in use to take a very slight but practically sufficient concavo-convex shape for thereby diminishing its diameter sufficiently to become instantly freed.

The hereinafter mentioned commercial and mechanical advantages of the invention also indicate its other objective features.

The present invention is in the nature of an improvement on the valves shown in my pending applications Serial No. 43,905 and No. 43,906 filed July 16, 1925.

In the accompanying drawings forming a part hereof and illustrating the invention, Fig. 1 is a vertical, central section through a lifting valve embodying this invention in which the valve port is sealed by a peripheral corner of an under disk in an upwardly tapering pile of successively usable sealing disks.

Fig. 2 is a view similar to Fig. 1, but in which two of the under disk members of the sealing pile have been removed.

Fig. 3 is a detail showing peripheral, disk corner sealing contact of the disk in use with the tapered annular wall of the valve port.

Fig. 4 is a cross-sectional view of the annular disk in use very slightly concavo-convexed by the upward lifting effort of the valve spindle in separating the two members and unseating the disk.

Fig. 5 is a vertical central section of another form of the invention in which the superposed, concentrically held disks instead of being stepped-up form a frustro-conical pile with a smooth peripheral surface.

In the form of the invention shown in Figs. 1 and 2, the under casing member 1 has a diaphragm 2 formed with a threaded opening $2^a$ between the intake and discharge chambers of the valve casing. Casing member 1 also has a port 3 and a port 4, one or the other of which forms an intake port, and one or the other of which forms a discharge port. Casing member 1 has a flange 5 bolted to a flange 6 of the bonnet 7 by bolts 8 and nuts 9. A gasket 10 is interposed between the flanges, and the upper casing member is provided with the usual interior means for carrying a threaded valve stem 11 which at $10^a$ is in threaded engagement with a threaded hole through the bonnet top and has a handle $11^a$ for use in reciprocating the spindle to seat and unseat the disk in use as a sealing disk. The under end of the stem is provided with a flanged enlargement 12 which is held in an inverted cupped nut 13 through the upper wall of which the stem passes freely, the nut being threaded into the upstanding, annular, threaded flange 14 of a sealing disk carrier 15. The disk carrier 15 has a reduced, under, threaded end stud 16 dependent from the central portion of the under flat wall 17 of carrier 15.

The flat annular relatively thin sealing disks are assembled in flatwise contact on wall 17, the stud 16 passing through the center holes of the sealing disks in the pile. The under disk rests on a washer 18 which with the superposed members of the pile is clamped on the threaded stud by a nut 19 held in place preferably by a cotter pin 20 through a hole in the stud. Washers of any desired thickness may be used with the pile assemblage as the under members of the pile become worn and are discarded.

As shown in Fig. 1, the pile of sealing disks comprises a bottom disk $a$ having the largest diameter; a disk $b$ of smaller diameter; a disk $c$ having a diameter less than the diameter of disk $b$ and a top disk $d$ of lesser diameter than the disk $c$; the pile being of stepped-up formation. The edges of the disks are at right angles to their flat sides and in the form of the invention illustrated, the under peripheral corner $x$ of each successive disk used as a sealing member forms the actually functioning disk sealing edge. The under peripheral corner of each of the superposed disks of succesively reduced diameter is succesively usable, if the members of the pile are successively removed from use. The complementary sealing surface is formed by the annular tapered wall 21 of the valve port through the valve port annulus 22 which is in threaded engagement with the diaphragm at its threaded opening $2^a$. The valve port wall 21 tapers downwardly and when a disk is seated, its under peripheral corner is pressed into contact with a cross-sectional wall portion of the port; all the other disks being then out of contact therewith and then being non-functional in respect to valve sealing. Nevertheless such disks as are out of use for valve sealing do perform a function during the functioning of the disk in use for sealing, such function being that of marginal support by each upper disk cooperating with the next lower disk in order to extend the support, afforded by the peripheral portion $17^a$ of the wall 17, to the increasingly larger peripheries of the lower disks and so to the disk in use as the sealing disk.

At or near the line of contact therewith of the disk in use as the sealing disk, the wall 21 of the port becomes sooner or later ground out or eroded by the wire-drawing action of fluid flowing, especially at high velocity, through the circular opening formed during the opening and closing operations between the edge of the disk in use as a sealing disk and the thereto opposed wall surface of the port. In time an annular groove or series of pits are thereby formed in wall 21. When the sealing disk is slightly off but near the port wall, the wire-drawing action in time erodes both the wall and sealing corner and edge of the disk in use as a sealing disk and fluid tight joints are not obtainable under such conditions. At the same time the edges and corners of the superposed disks which are to be used later on successively as sealing disks are completely protected from the wire-drawing action.

In Fig. 2 the lines $a'-a'$, $b'-b'$, $c'-c'$ and $d'-d'$ severally indicate the approximate under sealing corner positions of the disks $a$, $b$, $c$ and $d$, shown in Fig. 1, as such disks are successively used as sealing members.

In the form of the invention shown in Fig. 5, the superposed disks $a$, $b$, $c$, and $d$ instead of being stepped up, form a smooth walled, frustro-conical pile. The stepped-up construction is the better for some valves and the smooth surfaced frustro-conical pile is the better for other valves, all depending mainly on the kind of metal of which the disks are made, the thickness of the disks and the character of the service to which the disks are put.

The thickness or thinness of the disks broadly considered bears a relation to the material of which they are made and to their diameters. For example, in a valve with a 2" discharge port, the disks should be about 1/16" thick if made of sheet brass; whereas in a valve having a 6" delivery port the disks should be about 1/8" thick if made of sheet brass.

It has already been explained how if the sealing members sticks in the seat and thus tends to resist withdrawal, the sealing disk in current service can yield slightly into concavo-convex form and thus free the sealing member for withdrawal. The slower the taper, the greater the sticking tendency becomes. Thus by use of the thin disks, a slow tapered port wall 21 is practical; and as the slow taper involves reduced cross-sectional dimensions, the total weight of metal required for a valve of given area or capacity of valve discharge is reduced substantially and practically to a minimum.

Some commercial advantages of this invention are: Spare disks for renewal are always at hand when the valve is disassembled; the spare parts are not apt to be lost; require no attention in storage; no time and expense in counting and listing; no lost time on the part of workmen going to and from a storeroom to get repair disks; and the cost of repairs is economized. The advantages of the invention from the valve sealing viewpoint are that the disks may be made from rolled, tough and homogeneous sheet metal of firm and even texture, free from structural defects, whereby better sealing edges are produced than can be obtained from castings. One of the most customary materials for valve sealing members is bronze. If the present disks are made of bronze, the inherent yielding elasticity, due to the thinness and quality of the disks, makes each disk in use as a sealing disk elastically yieldable to form a perfect fit with the surface of the seat wall of port 21.

Also the yieldability of the relatively thin sheet forming the disk in use as a sealing disk makes it yield, in case it sticks, into concavo-convex form when pulled off the seat (Fig. 4), thus reducing the peripheral dimensions of the disk in use as a sealing member and thus freeing it from the wall.

What I claim is:

In a valve, the combination with an annular tapered valve port wall of a reciprocable pile carrying spindle; the pile including a series of separated, flatwise supported, normally flat, centrally held, sealing disks each having a peripheral sealing corner; the disk members forming and the pile being successively diminished in diameter in a direction corresponding to the disk unseating movement of the spindle and the disks ultimately usable severally as a sealing disk serving as supporting disks for the disk in use as a valve port closing element.

Signed at New York city, in the county of New York and State of New York, this 9th day of October A. D. 1925.

WYLIE GEMMEL WILSON.